(12) United States Patent
Liang et al.

(10) Patent No.: US 9,208,269 B2
(45) Date of Patent: Dec. 8, 2015

(54) BOUNDARIES IN FLUID DYNAMIC SYSTEMS

(71) Applicant: Engine Simulation Partners LLC, San Diego, CA (US)

(72) Inventors: Long Liang, San Diego, CA (US); Cheng Wang, San Diego, CA (US); Anthony Shelburn, San Diego, CA (US)

(73) Assignee: Engine Simulation Partners, LLC, San Diego, CA (US)

( * ) Notice: Subject to any disclaimer, the term of this patent is extended or adjusted under 35 U.S.C. 154(b) by 391 days.

(21) Appl. No.: 13/791,766

(22) Filed: Mar. 8, 2013

(65) Prior Publication Data

US 2014/0088934 A1   Mar. 27, 2014

Related U.S. Application Data

(60) Provisional application No. 61/608,529, filed on Mar. 8, 2012.

(51) Int. Cl.
G06F 17/50 (2006.01)

(52) U.S. Cl.
CPC ........ G06F 17/5009 (2013.01); *G06F 2217/16* (2013.01)

(58) Field of Classification Search
USPC ...................................... 703/2, 5, 9; 434/126
See application file for complete search history.

(56) References Cited

U.S. PATENT DOCUMENTS

| 7,565,276 | B2 * | 7/2009 | Song et al. | 703/2 |
|---|---|---|---|---|
| 2007/0239414 | A1 * | 10/2007 | Song et al. | 703/9 |
| 2011/0288834 | A1 | 11/2011 | Yamazaki et al. | |
| 2014/0087412 | A1 * | 3/2014 | Fouras et al. | 435/29 |

OTHER PUBLICATIONS

PCT/US2013/029998, entitled: Boundaries in Fluid Dynamic Systems, Notification Concerning Transmittal of International Preliminary Report on Patentability and International Preliminary Report on Patentability, dated Sep. 18, 2014.
Notification of Transmittal of the International Search Report and the Written Opinion for PCT Application PCT/US13/29998 dated Jun. 10, 2013.
International Search Report of the International Searching Authority for PCT Application PCT/US13/29998 dated Jun. 10, 2013.
Written Opinion of the International Searching Authority for PCT Application PCT/US13/29998 dated Jun. 10, 2013.

(Continued)

*Primary Examiner* — Thai Phan
(74) *Attorney, Agent, or Firm* — Jones Day

(57) ABSTRACT

A method for treating boundary cells over a time-step in a computational fluid dynamic process employing a computational mesh representation of a fluid system characterized by governing equations and having at least one moving boundary comprises: identifying interior cells, boundary cell faces, boundary vertices, interior vertices and vertex locations at the beginning of the time step; applying a calculation process that includes determining cell volumes based on Lagrangian locations of the interior and boundary vertices and calculating the value of at least one system thermodynamic property; calculating at least one flux value across one or more boundary cell volumes by returning the interior vertices to their initial locations.

13 Claims, 4 Drawing Sheets

(56) References Cited

OTHER PUBLICATIONS

Udaykumar et al. "A Sharp Interface Cartesian Grid Method for Simulating Flows with Complex Moving Boundaries." Journal of Computational Physics 174. 345-360 (2001).

Cirak et al., "A Lagrangian-Eulerian shell-fluid coupling algorithm based on level sets." Computers and Structures 63, 491-498 (2005), entire document, especially p. 493-495.

Donea et al., "Arbitrary Lagrangian-Eulerian Methods." Encyclopedia of Computational Mechanics, vol. 1; Fundamentals. Join Wiley & Sons, ltd. 2004 (2004), entire document.

Glimanov et al., "A hybrid Cartesian/immersed boundary method for simulating flows with 3D, geometrically complex, moving bodies." Journal of Computaional Physics (2005), entire document.

Engel et al., "Flow simulation on moving boundary-fitted grids and application 10 fluid-structure Interaction problems." Dec. 2004, entire document, especially p. 14 [online] (retrieved on May 10, 2013]. Retrieved from the Internet: <URI:http://Wissrech.iam.uni-bonn.de/research/pub/engel/preprint156.pdf>.

Sim et al., "Interfacial flow computations using adaptive Eulerian-Lagrangian method for spacecraft applications," Int. J. Numer. Meth. Fluids 2012, Published online Nov. 30, 2010, entire document [online] [retrieved on May 10, 2013]. Retrieved from the Internet: <URL:http://shyylab.engin.umich.edu/files/papers/Sim-Shyy-2012IJNMF.pdf>.

Chang et al., "A compatible Lagrangian hydrodynamic scheme for multicomponent flows with mixing," Journal of Computational Physics, vol. 231, Issue 11, pp. 4279-4294, Available online: Feb. 22, 2012, entire document [online] [retrieved on May 24, 2013]. Retrieved from the Internet: <URL: http://www.sciencedirect.com/science/article/pii/S0021999112000848)].

* cited by examiner

BOUNDARIES IN FLUID DYNAMIC SYSTEMS

RELATED APPLICATIONS

This Application claims priority under 35 U.S.C. §119(e) to U.S. Provisional Patent Application Ser. No. 61/608,529, filed Mar. 8, 2012, which is hereby incorporated by reference for all purposes.

TECHNICAL FIELD

The present application relates generally to computational fluid dynamic analysis of fluid systems, and, more particularly, to a method and apparatus for treating moving boundaries in fluid flow systems by employing an immersed-boundary computational mesh, in combination with an Arbitrary Lagrangian Eulerian (ALE) numerical solution technique.

BACKGROUND

Computational fluid dynamics ("CFD") is the study of fluid flows and the effect of fluid flows on processes such as heat transfer or chemical reactions in fluid systems. CFD facilitates the analysis of systems from relatively simple fluid flows through stationary channels and pipes, to complex systems with moving boundaries such as combustible flow in internal combustion or jet engines. Physical characteristics of fluid motion are defined by fundamental governing equations, including conservation relationships such as those of mass and momentum, which may be expressed as partial differential equations. CFD facilitates the determination and analysis of fluid system properties by providing for the numerical solution of these governing equations using discrete approximations.

SUMMARY

According to a first aspect, a method is provided for treating boundary cells in a computational fluid dynamic process employing a computational mesh of cells that represents a fluid system, each cell having faces, vertices and a volume, the system characterized by governing equations and having a set of boundaries, at least one of which is a moving boundary, the method comprising: (a) applying a solution process, the process including: identifying interior cells as those cells having a cell center within the interior of the fluid system; identifying moving cell faces as those separating an interior cell and a ghost cell and which are in proximity to a moving boundary at the beginning of a time-step; wherein each cell vertex that is disposed, at the beginning of the time-step, at an initial location on a respective moving cell face is a moving boundary vertex, and wherein each interior cell vertex that is disposed, at the beginning of the time-step, at an initial location not touching a moving cell face is an interior vertex; (b) applying a calculation process including the steps of: accessing system pressure values; calculating the value of at least one representative thermodynamic property of the system; determining a Lagrangian location of each interior vertex at the end of the time-step, as each interior vertex moves with the fluid flow in a Lagrangian fashion; determining a Lagrangian location of each moving boundary vertex at the end of the time step, as each moving boundary vertex moves with the respective moving cell face; determining the change in volume of each interior cell over the time-step, based on the displacement of its respective cell vertices to their respective Lagrangian locations; and calculating the value of at least one representative thermodynamic property of the system based on the changes in the interior cell volumes; (c) calculating at least one representative flux value across one or more interior cell volumes by returning the respective interior vertices from their Lagrangian locations to their respective initial locations.

According to a second aspect, an apparatus comprises at least one processor and at least one memory including computer program code, the at least one memory and the computer program code configured to, with the at least one processor, cause the apparatus to perform at least the following: (a) apply a solution process, the process including: identifying interior cells as those cells having a cell center within the interior of the fluid system; identifying moving cell faces as those separating an interior cell and a ghost cell and which are in proximity to a moving boundary at the beginning of a time-step; wherein each cell vertex that is disposed, at the beginning of the time-step, at an initial location on a respective moving cell face is a moving boundary vertex, and wherein each interior cell vertex that is disposed, at the beginning of the time-step, at an initial location not touching a moving cell face is an interior vertex; (b) apply a calculation process including the steps of: accessing system pressure values; calculating the value of at least one representative thermodynamic property of the system; determining a Lagrangian location of each interior vertex at the end of the time-step, as each interior vertex moves with the fluid flow in a Lagrangian fashion; determining a Lagrangian location of each moving boundary vertex at the end of the time step, as each moving boundary vertex moves with the respective moving cell face; determining the change in volume of each interior cell over the time-step, based on the displacement of its respective cell vertices to their respective Lagrangian locations; and calculating the value of at least one representative thermodynamic property of the system based on the changes in the interior cell volumes; (c) calculate at least one representative flux value across one or more interior cell volumes by returning the respective interior vertices from their Lagrangian locations to their respective initial locations.

According to a third aspect, a computer-readable medium including computer executable instructions which, when executed by a processor, causes an apparatus to perform at least the following: (a) apply a solution process, the process including: identifying interior cells as those cells having a cell center within the interior of the fluid system; identifying moving cell faces as those separating an interior cell and a ghost cell and which are in proximity to a moving boundary at the beginning of a time-step; wherein each cell vertex that is disposed, at the beginning of the time-step, at an initial location on a respective moving cell face is a moving boundary vertex, and wherein each interior cell vertex that is disposed, at the beginning of the time-step, at an initial location not touching a moving cell face is an interior vertex; (b) apply a calculation process including the steps of: accessing system pressure values; calculating the value of at least one thermodynamic property of the system; determining a Lagrangian location of each interior vertex at the end of the time-step, as each interior vertex moves with the fluid flow in a Lagrangian fashion; determining a Lagrangian location of each moving boundary vertex at the end of the time step, as each moving boundary vertex moves with the respective moving cell face; determining the change in volume of each interior cell over the time-step, based on the displacement of its respective cell vertices to their respective Lagrangian locations; and calculating the value of at least one representative thermodynamic property of the system based on the changes in the interior cell volumes; (c) calculate at least one representative flux value across one or more interior cell volumes by returning the respective interior vertices from their Lagrangian locations to their respective initial locations.

According to a fourth aspect, a method comprises: (a) accessing a data representation of a model associated with a transient fluid system including a fluid domain within a set of boundaries and having at least one flow velocity value, the fluid system characterized by a set of governing equations that express relationships among a set of thermophysical properties of the fluid system, each governing equation including at least one variable corresponding to a thermophysical property, wherein the set of thermophysical properties includes at least pressure and velocity, the fluid system further having at least one moving boundary wherein each moving boundary has a boundary velocity; (b) accessing a computational mesh representation of the fluid system, the computational mesh including a set of computational cells, each computational cell having a cell center, a volume, a set of cell faces, and a set of vertices; (c) applying a solution process over a time step, the solution process including the operations of: identifying, as an interior cell, any computational cell with a cell center disposed within the fluid domain at the beginning of the time step; discretizing one or more governing equations over cells of the computational mesh; identifying, as a moving cell face, any boundary cell face that separates an interior cell and a ghost cell and which is in proximity to a moving boundary at the beginning of the time step; identifying, as moving boundary vertices, any cell vertices that are disposed at an initial location on a moving cell face at the beginning of the time step; identifying, as interior vertices, any interior cell vertices that are disposed at an initial location not touching a moving cell face at the beginning of the time-step; (d) applying a computational process to determine values for the variables in the discretized governing equations, the computational process including the steps of: accessing predicted pressure values of the fluid system; updating one or more flow velocity values based on the pressure values; updating the cell volume of each interior cell based on the location of each cell vertex as each interior vertex moves with the fluid flow to a Lagrangian location over the time step and as each moving boundary vertex moves with the respective moving cell face to a Lagrangian location over the time step; updating one or more flow velocity values and calculating the value of at least one other thermophysical property of the system based on the updated pressure values and changes in the volumes of interior cells over the time step; (e) calculating at least one flux value across one or more interior cell volumes by returning the respective interior vertices of the one or more interior cells from their Lagrangian locations to their respective initial locations.

According to a fifth aspect, an apparatus comprises at least one processor and at least one memory including computer program code, the at least one memory and the computer program code configured to, with the at least one processor, cause the apparatus to perform at least the following: (a) access a data representation of a model associated with a transient fluid system including a fluid domain within a set of boundaries and having at least one flow velocity value, the fluid system characterized by a set of governing equations that express relationships among a set of thermophysical properties of the fluid system, each governing equation including at least one variable corresponding to a thermophysical property, wherein the set of thermophysical properties includes at least pressure and velocity, the fluid system further having at least one moving boundary wherein each moving boundary has a boundary velocity; (b) access a computational mesh representation of the fluid system, the computational mesh including a set of computational cells, each computational cell having a cell center, a volume, a set of cell faces, and a set of vertices; (c) apply a solution process over a time step, the solution process including the operations of: identifying, as an interior cell, any computational cell with a cell center disposed within the fluid domain at the beginning of the time step; discretizing one or more governing equations over cells of the computational mesh; identifying, as a moving cell face, any boundary cell face that separates an interior cell and a ghost cell and which is in proximity to a moving boundary at the beginning of the time step; identifying, as moving boundary vertices, any cell vertices that are disposed at an initial location on a moving cell face at the beginning of the time step; identifying, as interior vertices, any interior cell vertices that are disposed at an initial location not touching a moving cell face at the beginning of the time-step; (d) apply a computational process to determine values for the variables in the discretized governing equations, the computational process including the steps of: accessing predicted pressure values of the fluid system; updating one or more flow velocity values based on the pressure values; updating the cell volume of each interior cell based on the location of each cell vertex as each interior vertex moves with the fluid flow to a Lagrangian location over the time step and as each moving boundary vertex moves with the respective moving cell face to a Lagrangian location over the time step; updating one or more flow velocity values and calculating the value of at least one other thermophysical property of the system based on the updated pressure values and changes in the volumes of interior cells over the time step; (e) calculate at least one flux value across one or more interior cell volumes by returning the respective interior vertices of the one or more interior cells from their Lagrangian locations to their respective initial locations.

According to a sixth aspect, a computer-readable medium including computer executable instructions which, when executed by a processor, causes an apparatus to perform at least the following: (a) access a data representation of a model associated with a transient fluid system including a fluid domain within a set of boundaries and having at least one flow velocity value, the fluid system characterized by a set of governing equations that express relationships among a set of thermophysical properties of the fluid system, each governing equation including at least one variable corresponding to a thermophysical property, wherein the set of thermophysical properties includes at least pressure and velocity, the fluid system further having at least one moving boundary wherein each moving boundary has a boundary velocity; (b) access a computational mesh representation of the fluid system, the computational mesh including a set of computational cells, each computational cell having a cell center, a volume, a set of cell faces, and a set of vertices; (c) apply a solution process over a time step, the solution process including the operations of: identifying, as an interior cell, any computational cell with a cell center disposed within the fluid domain at the beginning of the time step; discretizing one or more governing equations over cells of the computational mesh; identifying, as a moving cell face, any boundary cell face that separates an interior cell and a ghost cell and which is in proximity to a moving boundary at the beginning of the time step; identifying, as moving boundary vertices, any cell vertices that are disposed at an initial location on a moving cell face at the beginning of the time step; identifying, as interior vertices, any interior cell vertices that are disposed at an initial location not touching a moving cell face at the beginning of the time-step; (d) apply a computational process to determine values for the variables in the discretized governing equations, the computational process including the steps of: accessing predicted pressure values of the fluid system; updating one or more flow velocity values based on the pressure values; updating the cell volume of each interior cell based on the location of each cell vertex as each interior vertex moves with the fluid flow to a Lagrangian location over the time step and as each moving boundary vertex moves with the respective moving cell face to a Lagrangian location over the time step; updating one or more flow velocity values and calculating the value of at least one other thermophysical property of the system based on the updated pressure values and changes in the volumes of interior cells over the time step; (e) calculate at least one flux value across one or more interior cell volumes by returning the respective interior vertices of the one or more interior cells from their Lagrangian locations to their respective initial locations.

BRIEF DESCRIPTION OF THE DRAWINGS

For a more complete understanding of various examples, reference is now made to the following descriptions taken in connection with the accompanying drawings in which.

DETAILED DESCRIPTION OF THE DRAWINGS

Figure 1:
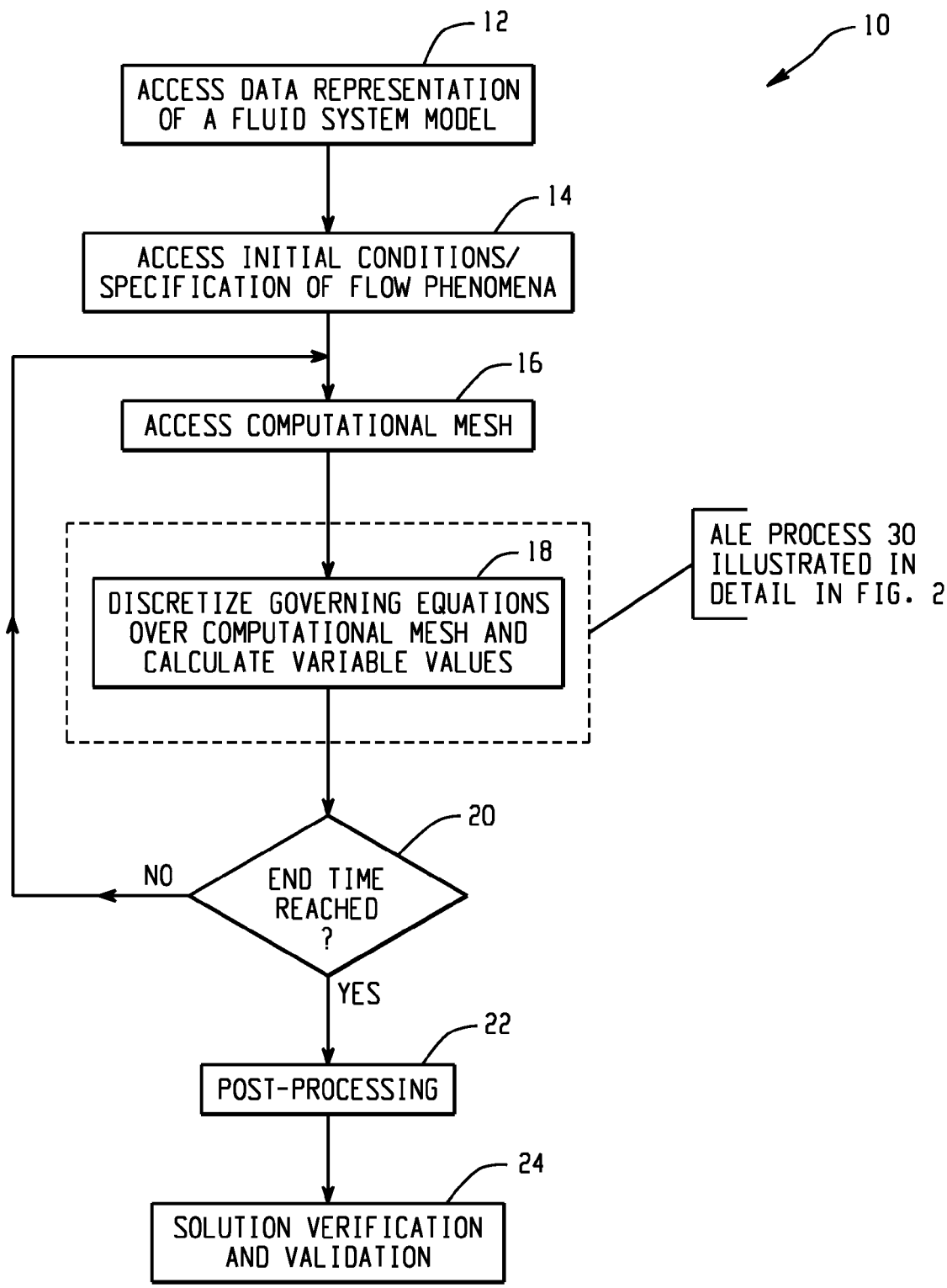
FIG. 1 is a flow chart illustrating a process according to one embodiment.

Various examples and their potential advantages are understood by referring to FIGS. 1-7 of the drawings.

More specifically, CFD methods provide for the discretization of the differential forms of the governing equations over a computational mesh that represents the fluid domain. Converting partial differential equations into a system of algebraic equations allows respective solutions to be calculated through the application of numerical methods. The algebraic equations may be solved in light of specific initial conditions and boundary-condition constraints to simulate the system fluid flow and determine the values of system properties and parameters.

In the context of CFD analysis, and as described in *Arbitrary Lagrangian-Eulerian methods*, by J. Donea, A. Huerta, J.-Ph. Ponthot and A. Rodriguez-Ferran, ALE methods for numerically solving the related mathematical equations incorporate advantages of Lagrangian and Eulerian solution approaches, while minimizing their disadvantages. For example, ALE techniques provide for the precise interface definition of Lagrangian methods, while allowing displacement of a computational mesh over time, as in purely Eulerian methods, without requiring frequent remeshing. Taking advantage of the Eulerian characteristic wherein a fluid continuum under study moves relative to a fixed computational mesh facilitates accurate analysis of large distortions in the fluid motion. As a result, more accurate treatment of greater-scale distortions of the mesh is possible than would be through purely Lagrangian solution techniques, while the resolution of flow details and precision of interface definition are improved over purely Eulerian methods. Id.

ALE solution algorithms may be used in combination with body-fitted mesh fluid system models, where the mesh edges conform to the boundaries of a fluid system being studied. For example, the KIVA-II computational fluid dynamics program utilizes an ALE solution algorithm in combination with body-fitted meshes, for the numerical calculation of transient, chemically-reactive fluid flows (with sprays). However, despite their flexibility for allowing advantageous positioning of nodes in the computational domain, disadvantages of using body-fitted meshes include difficulties of generating the mesh and automating the meshing process. Moreover, structured body-fitted meshes cannot easily be generated for systems with complex geometries, such as those that include curved walls, inlets, outlets, or moving parts. Traditional methods to overcome these difficulties, such as increasing cell density, stretching and distorting cell shapes to fit geometric irregularities of the system, or utilizing unstructured meshes are liable to reduce solution accuracy and stability, as well as to increase compute time.

As an alternative to "body-fitted" methods, "immersed-boundary" or "embedded-boundary" approaches may be employed in CFD analysis. Such methods facilitate the use of a Cartesian computational mesh throughout fluid system, with special treatment of cells near the system boundary, albeit without significant stretching and distortion of cells relative to the coordinate axes. Employing "immersed" or "embedded boundary" mesh generation techniques results in reduced mesh irregularity, as well as relative simplicity and increased speed in an automated mesh generation process. Since the sources of solution error decrease as a mesh approaches a perfect Cartesian alignment, embedded boundary approaches improve solution accuracy and stability.

There are two classes of "immersed boundary" approaches. One "immersed boundary" approach involves the use of irregularly-shaped cells (so-called "cut cells"), at the fluid system boundaries, and the computational algorithm includes methods to account for these irregularly-shaped cells. In such approaches, cells are "cut" linearly along system boundary lines or surfaces that intersect the cells. An advantage of the "cut cell" approach is that it tracks the exact location of moving boundaries so that the computational domain conforms to the physical geometry. Thus, it is straightforward to apply a moving boundary velocity directly to let the interior fluid "feel" the compression and expansion effect due to the boundary motion. However, a disadvantage of the "cut cell" approach is that the flow transport computational algorithms need to be modified extensively to account for a large variety of irregularly-reshaped cells at the boundaries. The cutting or reshaping of cells to fit the system geometry may also result in a large number of relatively tiny cells near system boundaries, which may cause deterioration of solution accuracy and stability.

The other class of "immersed boundary" approach involves the use of regularly shaped cells that extend outside of the physical boundary, or so-called "ghost cells." "Ghost cell" methods incorporate extrapolation and interpolation to define variables on the background mesh, and to calculate solutions of the governing equations based on the regular cells. They rely on particular interpolation and extrapolation details, which are used to facilitate enforcement of the exact boundary conditions on the physical boundary. An advantage of "ghost cell" approaches is that they allow for the use of Cartesian meshes throughout the fluid system of interest, including the boundary areas, without having to resort to reshaping cells at or near system boundaries, utilizing polyhedral or tetrahedral cell shapes, or increasing mesh density to unwieldy levels. A disadvantage of "ghost cell" approaches is that it is difficult to accurately model the effects of boundary motion on the system when employing formulations for finite volume discretization. This is because in the ghost-cell method, the cells in the Cartesian mesh that are disposed at or near system boundaries preserve their cubic shape to avoid cell distortion. In this way, the cell boundaries cannot simply move at the same velocity as the specified moving boundary velocity, since the interior fluid must accurately register the effects of compression or expansion, which coincides with the boundary movement.

An approach that combines the benefits of "ghost cell" immersed boundary mesh analysis methods with the flexibility of the ALE equation-solution techniques would be advantageous in simulation and analysis of fluid domains with moving boundaries.

Various examples are described below that may be used in simulation or modeling of fluid systems. In various embodiments, a solution process 10 for analyzing a fluid system is shown, generally, in FIG. 1. The solution process 10 may be used in simulation and modeling of a fluid system, for example. At box 12, data representing the approximate geometry and physical boundaries of a fluid system is accessed. In an embodiment, such data may be a pre-existing computer-aided design ("CAD") model of the fluid system geometry and physical boundaries. It may be accessed in "wireframe" form, and it may include surfaces. Such pre-existing data may be imported, uploaded, downloaded, or accessed from memory or storage media by a computing device, for use in the fluid system analysis. In one embodiment, such data may also be generated as part of the step depicted at box 12. Since system boundaries, such as the walls, inlets, outlets, moving parts or other physical surfaces that define the fluid system being studied may be defined and detailed by means of computer-aided design ("CAD") drawings, compatibility between CAD and meshing systems may provide for ease of integration of a computational mesh with CAD-defined system boundaries in various embodiments.

I. Meshing

As illustrated at box 16, in an embodiment, an existing computational mesh may be accessed, imported, or otherwise retrieved in similar fashion as the geometric data and system specifications discussed above. Or, a computational mesh may be generated for the system under study, although embodiments are not limited to methods that include a mesh generation step. A computational mesh, or a numerical grid, subdivides the geometrical region of the fluid system under study (i.e., the "computational domain") into discrete cells for numerical analysis. Selecting, accessing or generating a computational grid may also take into consideration initial conditions and specifications of the physical flow phenomena so that the grid is suitable for capturing these phenomena. These phenomena may include, for example, turbulence, compressible flow, system shocks, combustion, multiphase flow, mixing, etc. As illustrated at Box 14, these conditions and specifications may be accessed for use in the fluid system analysis, in similar fashion as the data representation of the fluid model is accessed as described above. Variables representing applicable flow phenomena may be included in the partial differential forms of the governing equations for the fluid system under study, so that these phenomena may be discretized over the computational mesh as described below, so that solutions to the equations may ultimately be determined.

Referring again to Box 16, meshes may be defined using various coordinate systems. For example, in a Cartesian mesh, the mesh axes are perfectly orthogonal to each other, which generally provides for simplified calculation of the relevant equations, as compared with other coordinate systems such as rectilinear or curvilinear systems. Non-Cartesian systems, by their nature, tend to require more complex calculations (however, certain non-Cartesian coordinate systems may naturally fit particular geometries better; thus, although they may require more complex calculations, the net effect of using a more complex coordinate system may result in reduced grid generation time and fewer complications in generating a grid to represent geometries for which such systems may be particularly suitable). Cartesian meshes tend to facilitate analytical determination of the relationships between neighboring cell centers and interfaces, because solving conservation equations between neighboring cells is simplified in a straightforward, regular, repeating system with a uniform cell size and shape and aligned boundaries between cells. Other coordinate systems, such as rectilinear or curvilinear systems may be employed in CFD to define meshes, although, as described above, these tend to increase the complexity of the meshing and solution processes. In one embodiment, a Cartesian mesh is used to define the computational domain, although other coordinate systems, such as rectilinear or curvilinear, for example, may be employed in other embodiments.

Generally, structured meshes are composed of logical "blocks" or mesh regions, wherein each region includes uniform cells, and the cells follow the coordinate system. The obvious advantages of structured meshes, including ease of reference by the regular indices of the coordinate system employed (e.g., regular, repeating i, j coordinates in a Cartesian system), and straightforward connectivity between cells, facilitate clean, accurate CFD analysis. In contrast, complex and irregular system geometries do not lend themselves to such straightforward meshing. In such cases, system boundaries may require cell distortion and stretching to conform to boundary shapes. Disadvantages of structured meshes in such cases may include difficulties in generating the mesh and high levels of distortion required to maintain the block structure around complex and irregular boundary geometries. Although a uniform structured mesh, particularly a Cartesian mesh, may simplify the solution of conservation equations between adjacent cells, the geometry of complex fluid systems often cannot be exactly represented by such meshes.

For example, when analyzing a pipe or other system geometry that includes curved walls, inlets, outlets, or moving parts, the system boundaries may not perfectly coincide with the edges and faces of cells in a Cartesian mesh. This can result in the occurrence of gaps or interference mismatches between the system boundary and the Cartesian mesh. It is easy to imagine system geometries that give rise to such problems, such as where a fluid passage under study is cylindrically-shaped or includes an interior feature such as a butterfly valve or a bolt passage, for example. In such systems, the resulting interference or gaps may produce inaccurate results, instability and errors in mathematical analysis of the system. Increasing the mesh density by reducing the cell size may improve coincidence between the complete mesh cells and system boundaries, thus improving accuracy. However, increasing the number of cells in a fluid system with irregular boundaries tends to slow down the overall analysis by requiring more processing time, which may at some point become prohibitive.

In order to improve accuracy and reduce computing times, other approaches have been developed to construct meshes for irregular geometries, such as "body-fitted" meshes in which the mesh cells at the system boundary are distorted relative to the ideal cubic shape of a "structured" Cartesian mesh (or the ideal cell shape of any other coordinate system being used), in order to conform to the boundary surface. This allows for most of the fluid continuum area or volume to be modeled on a regular "structured" mesh, except for system boundaries. However, the distorted cells in such "structured" systems require special treatment, and can give rise to inaccuracies. Another commonly used method for generating "body-fitted" meshes is to employ so-called "unstructured meshes," which allow for non-regular shapes to be used in boundary areas of irregular geometry. In unstructured meshes, cells may be arranged freely within the computational domain. However, approaches that utilize irregular shapes cannot leverage the computational efficiency of a structured mesh, particularly a Cartesian mesh. Thus, utilizing "body-fitted" approaches to define meshes for irregular domain geometries presents challenges such as difficulty in generating and mathematically handling cells at system boundaries, loss of accuracy due to stretched and distorted cells, and increased use of computing resources due to irregularly shaped cells or unwieldy mesh densities.

As discussed above, employing "immersed boundary" approaches rather than "body-fitted" methods may be advantageous for simplifying computations in complex fluid dynamic problems. For treating system boundaries that do not line up with the computational mesh, however, "immersed boundary" approaches may be employed with techniques such as the cut cell technique, wherein the cells are "cut" linearly along the line or surface where a boundary intersects the cell. As mentioned above, special computational algorithms and approximations developed for this approach are employed to balance and optimize accuracy and manage the use of computational resources.

Alternately, "immersed-boundary" approaches may be used in conjunction with "ghost cell" techniques at system boundaries. Within an "immersed boundary" computational mesh representation of a fluid system that utilizes "ghost cells," interior cells are those cells on the computational mesh with centers disposed within the fluid system, including such cells that are intersected by a system boundary. A "ghost cell," on the other hand, is a regularly-shaped cell on the computational mesh that has a center outside the boundary of a fluid system, and adjoins, or shares a cell face with, at least one interior cell. "Ghost cell" methods rely on particular interpolation and extrapolation details to facilitate enforcement of exact boundary conditions on the physical system boundary. In an embodiment, a "ghost cell" approach may be applied at box 16, in conjunction with a mesh defined according to an "immersed boundary" method, to define the computational domain of a fluid system in terms of a Cartesian mesh, such that the fluid system is enveloped within a layer of "ghost cells" at the boundaries. The method and apparatus of embodiments described herein may be used in conjunction with methods for utilizing "ghost cells" in the modeling and analysis of fluid systems, as disclosed in U.S. Application Ser. No. 61/551,590, filed Oct. 26, 2011, and incorporated herein, in its entirety, by reference. Alternately as discussed above, a mesh generated by utilizing an "immersed-boundary" approach in combination with a "ghost cell" technique may be accessed or retrieved for analyzing the system in accordance with an embodiment.

A more detailed discussion of immersed boundary methods and ghost cell techniques is beyond the scope of this disclosure, and is not necessary to understanding the various examples described herein. It is to be appreciated, however, that "immersed boundary" approaches, and "ghost cell" methods other than those described or referred to herein, may be utilized in various embodiments.

II. Discretization

In various embodiments, once a computational mesh is defined, generated or accessed, the governing equations may be "discretized" over the mesh, as illustrated at box 18 of FIG. 1. Simply stated, discretization is the process of converting the differential or integral forms of the governing fluid equations of a fluid system of interest, into algebraic equations associated with discrete elements of the system. These discrete system elements, or nodes, may be the cells, or parts of cells, that are part of a computational mesh representation of the system, as described above (these are also referred to herein as "computational cells"). Since the governing equations express relationships between thermophysical properties of the system, discretizing the representative equations over the mesh facilitates calculation of system properties at discrete computational cells of the mesh. In an embodiment, the discretization step illustrated at box 18 may thus be part of a multi-step computational process as is described in greater detail below and in FIG. 2. Moreover, thermophysical properties may characterize the state or condition of the discrete areas and components of the fluid system under study at particular times. In the study of fluid systems, various thermophysical properties, such as temperature, pressure, as well as mass, heat and momentum fluxes, for example, are often of particular interest and may thus be "representative" of the system under study. It is to be appreciated that various embodiments are not limited to the determination of any particular thermophysical system properties, but may be employed to determine any such properties of interest.

In an embodiment, the governing equations may be discretized in accordance with various finite volume methods (described in greater detail, below), over a Cartesian "immersed boundary" mesh with a "ghost cell" technique applied at the system boundaries. Utilizing a finite volume method for discretization over a Cartesian mesh results in a high degree of solution accuracy. As shown at box 18, the algebraic equations resulting from the discretization process may be solved to calculate the values for the various equation variables (representing thermophysical system properties) at discrete computational locations, or nodes, throughout the fluid system.

Several numerical solution techniques may be used in solving the discretized algebraic equations over computational grids in CFD analysis. Traditionally, Arbitrary Lagrangian Eulerian ALE solution methods have been applied in the numerical solution of equations discretized over body-fitted meshes. As an example, the use of an ALE solution algorithm in conjunction with a body-fitted mesh for the analysis of fluid systems has been documented (see *KIVA-II: A Computer Program for Chemically Reactive Flows with Sprays*; A. A. Amsden, P. J. O'Rourke, T. D. Butler, Issued May 1989).

ALE solution algorithms are characterized by a high degree of efficiency in solving the respective mathematical forms of fluid system governing equations. This efficiency facilitates consideration of additional system complexities, such as the utilization of a staggered mesh. A staggered mesh is a computational mesh in which points on the faces of respective control volumes (i.e., individual cells of the coordinate mesh) are used in the calculation of velocity components of the fluid system, while other system variables are calculated at the center of the respective control volumes. In contrast, when utilizing a non-staggered mesh, all equations and variables representing system properties (including velocity) are discretized with respect to the center of the respective control volume/cell. Due to collocation of the velocity and pressure equations on the centers of computational cells in non-staggered meshes, the use of such meshes may lead to solution instability, since pressure depends on the derivative of velocity. While staggered coordinate meshes may be characterized by greater complexity, they are not susceptible to instability with respect to the equation solutions, and thus avoid related "checkerboard" pressure pattern solutions that may result from the utilization of non-staggered meshes. The inherent efficiency of ALE methods can minimize the drawbacks of utilizing more complex staggered meshes, thus overcoming stability issues that may result from the use of non-staggered mesh definitions.

ALE methods represent a hybrid approach that combines aspects of various pure Lagrangian and pure Eulerian methods, while minimizing shortcomings of each. The flexibility of ALE approaches may provide for the nodes (i.e., the particular cell features where system properties are referenced for calculation; nodes may be cell centers, vertices, faces, etc., and the governing equations are discretized with respect to the particular cell features identified as nodes) of a computational mesh to be: i) moved with the fluid continuum as in an a Lagrangian approach; ii) held fixed while the fluid continuum moves with respect to the mesh, as in an Eulerian approach; or iii) moved in an arbitrarily specified way to provide a continuous rezoning capability. This freedom to move the computational mesh overcomes the inability to follow large distortions of the computational domain without frequent remeshing, as required in purely Lagrangian approaches. In addition, precise interface definition and resolution of flow details may be maintained with ALE methods, while managing large distortions in the motion of the fluid continuum, thus overcoming the degradation of interface definition and flow detail resolution that characterizes purely Eulerian methods (see, generally, *Arbitrary Lagrangian-Eulerian methods*, by J. Donea, A. Huerta, J.-Ph. Ponthot and A. Rodriguez-Ferran).

In various embodiments, discretization of the governing equations over a computational "immersed boundary" mesh may involve spatial discretization according to ALE methods over a series of time steps. Generally, as mentioned above, the governing equations may be discretized in accordance with various "finite volume" ("FV") methods. See, Notes on the *KIVA-II Software and Chemically Reactive Fluid Mechanics*, Michael J. Holst, Aug. 1, 1992.

Although a detailed description of FV methods is not essential for understanding various aspects, some related discussion is provided for illustrative purposes. FV methods facilitate discretizing the integral forms of the governing equations directly over the mesh definition of a fluid system. As part of this process, function values for the governing equations (i.e., solutions of the mathematical forms of governing equations expressing relationships between system properties) may be calculated at the centers of each computational cell, or at the centers of computational cell surfaces (each computational cell, a "control volume"). Interpolation is then applied to express variable values at the control volume surfaces in terms of the values at the cell center. Quadrature formulae are then applied to approximate the surface (i.e., function value at face center times face area) and volume integrals (i.e., function value at cell center times the cell volume). See, generally, Notes on the *KIVA-II Software and Chemically Reactive Fluid Mechanics*, Michael J. Holst, Aug. 1, 1992. An algebraic equation for each control volume can thus be obtained, the equation also considering a number of the neighboring nodal values. An advantageous characteristic of finite volume methods is the capacity to accommodate any type of mesh, including Cartesian meshes, due to the operation of such methods with control volumes rather than grid intersection points. As discussed above, however, utilization of a Cartesian mesh facilitates greater numerical accuracy and reduced solution times with respect to the governing equations, including the conservation laws across cell boundaries, although embodiments may employ other types of coordinate systems.

III. ALE Process

Figure 2:
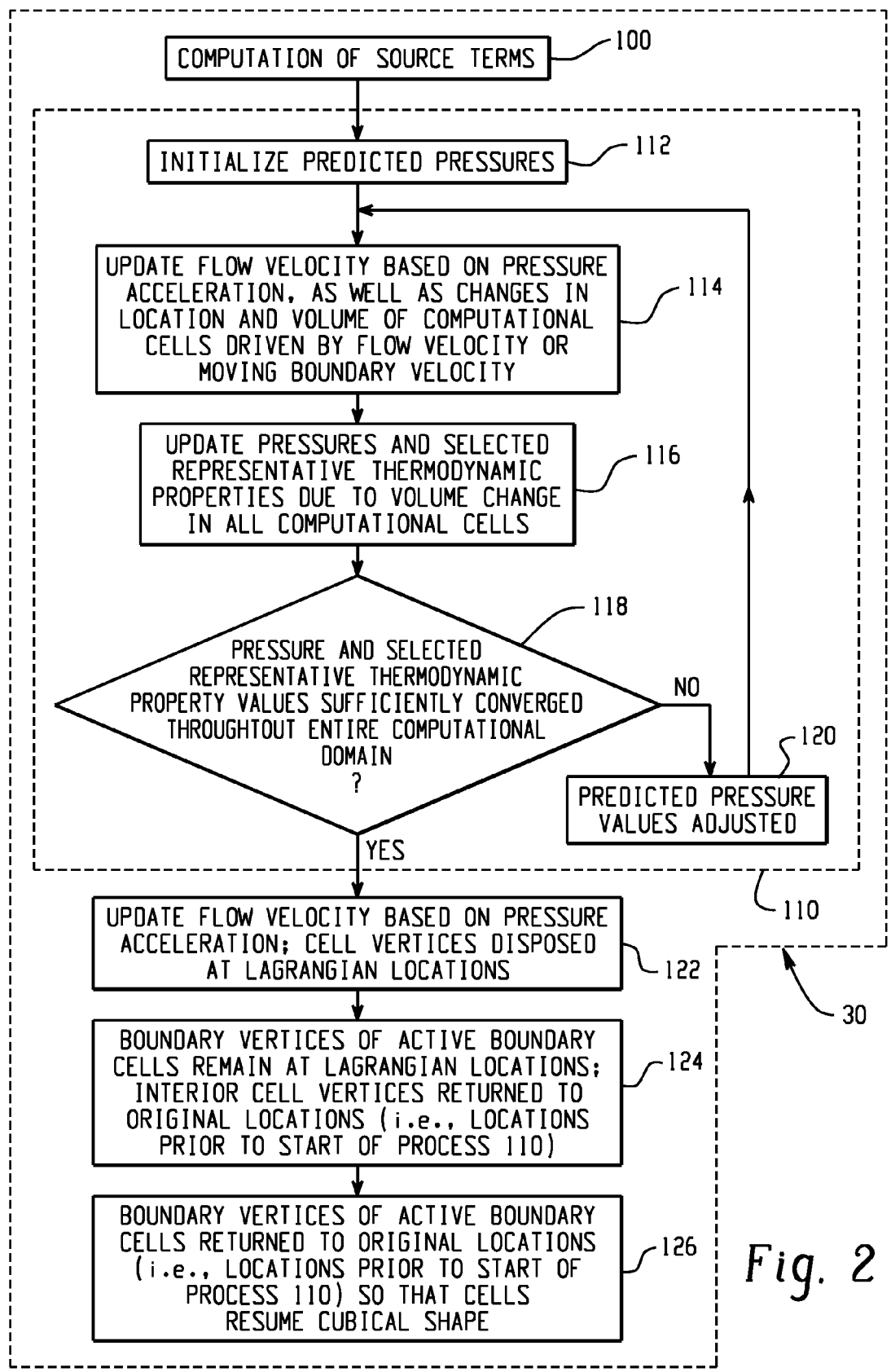
FIG. 2 is a flow chart illustrating a detailed view of a process that may be employed as part of an exemplary disclosed method for fluid system analysis.

In an embodiment, functions (i.e., relationships among variables as expressed in the mathematical forms of the governing equations) in the fluid continuum under study may be discretized spatially, over one or more "time steps," with calculation of intermediate function values over the course of each time-step. Thus, embodiments may facilitate the analysis of systems with transient fluid flows or which include boundaries in motion, the motion of which may also be transient. FIG. 2 illustrates an exemplary process 30, according to an embodiment, which may be employed as part of the discretization step illustrated at box 18 of FIG. 1. Referring now to FIG. 2, process 30 may incorporate application of an ALE method in conjunction with a "ghost cell" technique at system boundaries to determine the values of state variables throughout the fluid system, and to ultimately determine solutions or specific values for thermodynamic properties of the fluid system, as expressed in the governing equations of the fluid system. The governing equations may include transport equations as well as conservation equations, for example, and the thermodynamic properties may include pressure and velocity, among others.

In an embodiment, the source terms of relevant system transport equations may be computed in an optional step illustrated at box 100. The source terms may be computed in light of the effects of initial system properties such as chemistry, particle motion and interactions, wall heat transfer, etc., including those based on initial conditions that may have been accessed or input at box 14 of solution process 10, as illustrated in FIG. 1. However, the discretization step is not dependent on the computation of source terms, and in an embodiment, other steps of the process illustrated in FIG. 2 may proceed without the computational step shown at box 100.

In an embodiment, mass and heat diffusion terms may be solved, and the values of other thermodynamic properties may be determined in a computational process which is shown, generally, at 110. As certain vertices of computational cells move in a Lagrangian fashion, computational process 110 may facilitate the solution of equations that are linked to determining the values of thermodynamic system properties, such as fluid pressure and velocities throughout the system, which may vary with cell volume and location. The effects of any moving system boundaries on the pressure and velocity terms may also be calculated as part of computational process 110. As illustrated at Box 112, predicted pressures may be accessed or input during computational process 110. This initialization of predicted pressure values may facilitate the initial computation of fluid velocities, as well as changes in cell volume values and corresponding solutions for state variable values throughout the system. Initialized pressures may be interim estimates that are input during the process at this point. In another embodiment, they may be accessed at box 112 in similar fashion as the data representation of a fluid system model is accessed, as described above. In an embodiment, predicted pressures are subject to refinement and adjustment throughout computational process 110, as will be discussed in greater detail, below.

As the fluid domain or continuum moves, the vertices of computational cells disposed entirely within the fluid domain may move with the fluid, at a respective fluid velocity, following a Lagrangian path. This may occur over a time-step, as discussed above, or over successive time-steps. The initializing of predicted system pressures at the beginning of a time-step, as discussed above and shown at Box 112, may affect the pressure gradients and thus the fluid velocities throughout the system. Moreover, fluid system velocities may vary from region-to-region throughout the system, and from cell-to-cell, based on system geometry and parameters, pressure gradients, or if the fluid system being studied is characterized by a transient flow. Accordingly, as illustrated at Box 114, system flow velocities may be updated to reflect the effects of the pressure gradients and pressure acceleration within the system.

The volumes of computational cells disposed entirely within the fluid domain may thus change, in an embodiment, as their respective vertices are displaced due to the fluid flow. The moving interior vertices (and respective cells) may thus "float" with the fluid in a Lagrangian fashion from an initial location (i.e., their respective locations at the beginning of a time-step) to a Lagrangian location over the duration of the time-step. The moving cell vertex locations and the volumes of respective cells may also be updated as illustrated at Box 114. A detailed description of Lagrangian flow principles is beyond the scope of this disclosure, however, and is not necessary to understand various embodiments described herein.

The motion and behavior of computational cells at system boundaries are subject to additional forces and considerations beyond the effects of fluid flow, such as boundary motion and heat transfer from boundaries, for example. If system boundaries do not align with the coordinate system of the computational mesh, the boundaries may intersect computational cells, thus resulting in irregularly-shaped cells at the system boundaries, as discussed above. As also discussed above, however, techniques may be employed for analysis of system properties at these cells. For example, in an embodiment, "ghost cell" methods may be applied for the effective modeling and analysis of computational cells at system boundaries. As previously discussed, every computational cell that has a cell center disposed within the system boundaries, i.e., within the fluid domain or continuum, is an interior cell (including such cells that are intersected or "cut" by system boundaries). In contrast, "ghost cells" are those cells on the computational mesh that have a center disposed outside of the system boundaries and adjoin (i.e., share a face with) at least one interior cell. A "boundary cell" is an interior cell that adjoins one or more ghost cells, and which may or may not be intersected by a system boundary. "Ghost cell" methods may provide for the contributions of volume and other system properties from "ghost cells" to neighboring interior cells, in order to facilitate the analysis of the adjoining boundary cells.

In an embodiment, any cell face separating an interior cell and a ghost cell and that is in proximity to a system moving boundary at the beginning of a time-step is a moving cell face. The vertices disposed on each moving cell face at the beginning of a time step are referred to as moving boundary vertices, whether the respective vertex is actually within the fluid domain or outside of the system boundary. Vertices disposed on cell faces of interior cells and which do not touch a moving cell face at the beginning of a time-step are interior vertices. The "interior" vertices of boundary cells may move with the fluid flow in a Lagrangian fashion over the duration of the time-step, as described above, and in greater detail, below.

In contrast, moving boundary vertices may move with the moving boundary (i.e., in the same direction), and at a prescribed velocity that is based on the velocity of the moving boundary, over the duration of the time-step. Although the movement of moving boundary vertices with moving system boundaries does not necessarily follow a Lagrangian path, the locations of such moving boundary vertices at the end of the time-step are referred to herein as "Lagrangian" locations. Thus, as illustrated at box 114, the moving boundary vertices of boundary cells and the interior vertices (i.e., the interior vertices of boundary cells and the vertices of each computational cell that is entirely within the fluid domain) move from an initial location to a "Lagrangian" location over the time-step. The movement of interior and moving boundary vertices to the "Lagrangian" locations may cause changes in the volumes of respective computational cells. In an embodiment, vertices disposed at the intersection of moving and non-moving boundaries may be treated as moving boundary vertices. In another embodiment, vertices disposed on stationary boundaries may remain stationary over the time-step, although an understanding of the treatment of such vertices is not required to understand or implement various examples. The values of system properties, state variables and fluxes at computational cells near system boundaries, as well as their contributions to the values of these items at other computational cells throughout the system, may be analyzed and calculated in accordance with ghost cell methods. For example, the methods described in U.S. Application Ser. No. 61/551,590, filed Oct. 26, 2011, as referenced above, teaches methods for analyzing the properties of such cells, including contributions from "ghost cells."

The motion of moving boundaries and the corresponding effect on boundary cells, along with the Lagrangian motion of the interior cells, results in volume changes of the computational cells, and can cause compression or expansion of the interior fluid region that is not in the vicinity of the system boundaries. As illustrated at box 114, the locations of vertices and changes in volume of computational cells throughout the system are thus updated for use in other calculations of computational process 110 that will be discussed in greater detail below. For example, the pressure values and values of state variables throughout the fluid continuum are liable to change due to the changes in the computational cell volumes, as illustrated at box 116. In sum, computational process 110 may be employed to determine the changes in the locations of computational cell vertices and the corresponding changes in cell volumes and state variables throughout the system over the course of a time-step, thus accounting for the effects of moving boundaries.

In an embodiment, computational process 100 may be repeated in an iterative fashion. As illustrated at decision diamond 118, if selected representative thermodynamic properties, such as pressure values and state variables of the computational cells, for example, have not converged to a given criteria at the end of a time-step, the predicted pressures may be adjusted as illustrated at box 120, and computational process 110 may be repeated for a specified number of iterations, or until the desired convergence criteria are satisfied. Convergence of all state variables is not required in the various embodiments. Rather, system pressure may be checked for convergence along with any one or more state variables, or none at all. Moreover, embodiments are not limited to a particular method of checking solution convergence, and various methods may be used. In an embodiment, computational process 110 may repeat for a specified number of iterations.

Upon completion of the computational process 110 (i.e., when pressure values and the state variables are sufficiently converged, or computational process 110 has repeated for the specified number of iterations), the vertices driven by fluid flow or boundary motion remain disposed at their Lagrangian locations, and system thermodynamic properties, such as flow velocities, are updated, as shown at box 122. Moreover, as illustrated in FIG. 3, the moving cell faces may move with the boundary during the computational process 110, so that the volumes of the respective boundary cells change, and the system may "feel" the compression or expansion effect imparted by the moving boundary, as described in greater detail, below.

In an embodiment, fluxes of system parameters may then be calculated across the faces of the respective mass and momentum control volumes (i.e., respective computational cells) by displacing, or "dragging," interior vertices to an arbitrary location as shown at box 124. These may include mass flux or momentum flux, among others. This arbitrary location of an interior cell vertex may be taken to be its initial location, i.e., its location at the beginning of the time-step. On the other hand, during this step, the boundary vertices of boundary cells remain at their Lagrangian locations. In addition, the fluxes across the wall boundary faces may be set to zero. This is typically the final step of a conventional ALE process. At this point, the computational cells at a moving boundary and some of their immediate interior neighbors are slightly deformed from their original cubic shape. This effect is described in greater detail, below.

In an embodiment, after the desired mass and momentum flux values are calculated, moving boundary vertices of boundary cells may be "dragged" back to their initial locations (i.e., their respective locations at the beginning of the time-step), so that the boundary cells resume their cubic shape on the Cartesian mesh, as shown at Box 126. Because the locations of the boundary cell faces are restored at the end of each time-step, the velocity magnitude of the moving boundary is modified in the ALE solution procedure to let the interior cells "feel" the exact compression or expansion effect. Thus, following the boundary motion and resulting changes in system properties, the calculation in the next time-step will be based on an orthogonal Cartesian mesh again, notwithstanding the intermediate cell distortion.

Figure 3:
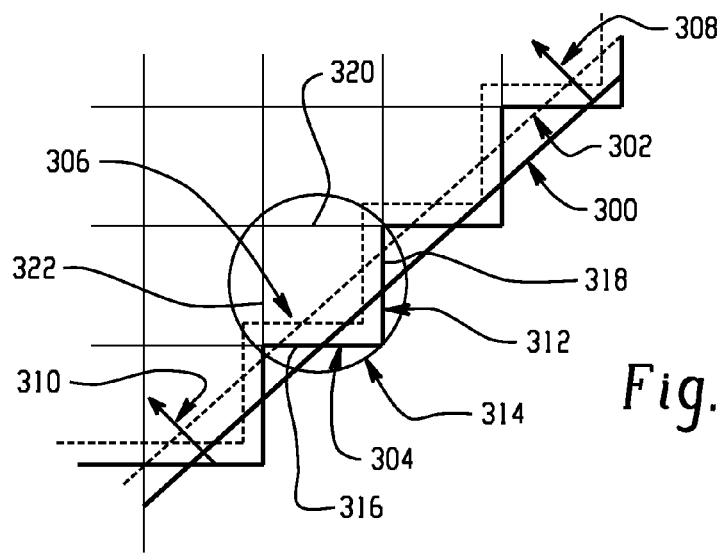
FIG. 3 is a schematic representation of a fluid system boundary and Cartesian mesh computational cells for use in analysis of fluid system boundaries over time in accordance with an exemplary disclosed method for fluid system analysis.

FIGS. 3-6 represent an exemplary illustration of the cell movement and deformation that may occur in the process illustrated in FIG. 2. Although FIGS. 3-6 illustrate this cell movement and deformation within the context of a Cartesian computational mesh, embodiments are not limited to employing Cartesian coordinate systems, but can incorporate other types of coordinate systems as discussed in greater detail, above. Referring now to FIG. 3, there are shown the initial and Lagrangian locations of both a physical moving boundary, 300, 302 and a Cartesian moving boundary, 304, 306 respectively, over a time-step, wherein the solid thick lines are the initial locations and the dashed lines are the final locations. In an embodiment, the Cartesian moving boundary may be composed of moving cell faces. The physical boundary moves at prescribed moving velocity $U_{physical}$, as illustrated at vector 308. Vertices on the Cartesian moving boundary move at an adjusted velocity $U_{Cartesian}$, as illustrated at vector 310. Referring again to FIG. 3, boundary cell 312, within circled area 314 is taken as an example to show how the locations of moving boundary vertices, interior vertices and Cartesian boundaries may change during process 30 illustrated in FIG. 2.

Figure 4:
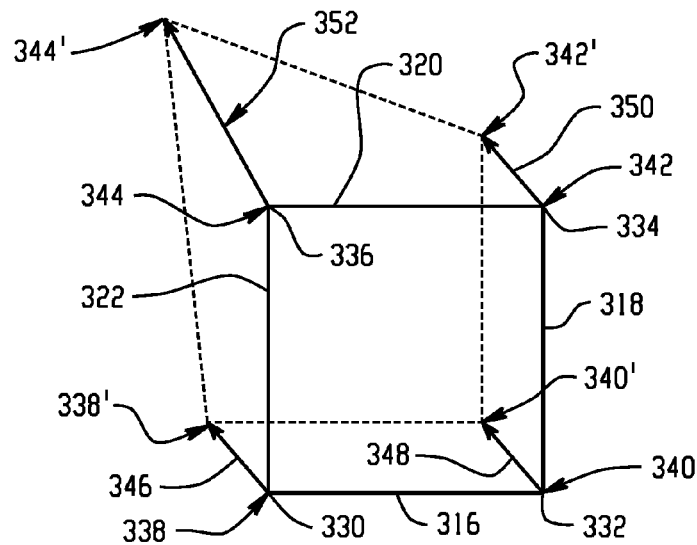
FIG. 4 is a schematic representation of the displacement of boundary cell vertices from their initial locations to respective Lagrangian locations over time in accordance with an exemplary disclosed method for fluid system analysis.
Figure 5:
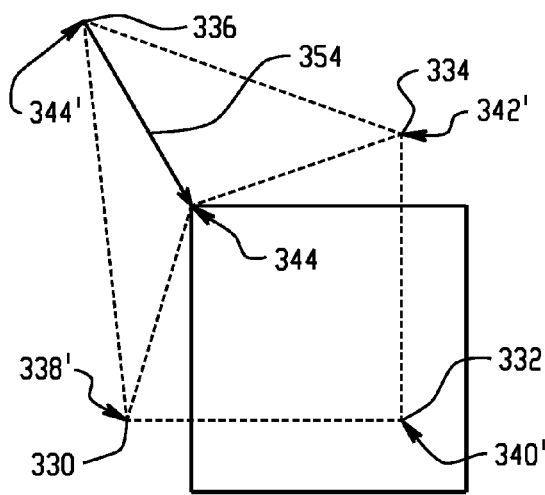
FIG. 5 is a schematic representation of the displacement of a vertex of a boundary cell from a Lagrangian location to its initial location, in accordance with an exemplary disclosed method for fluid system analysis.
Figure 6:
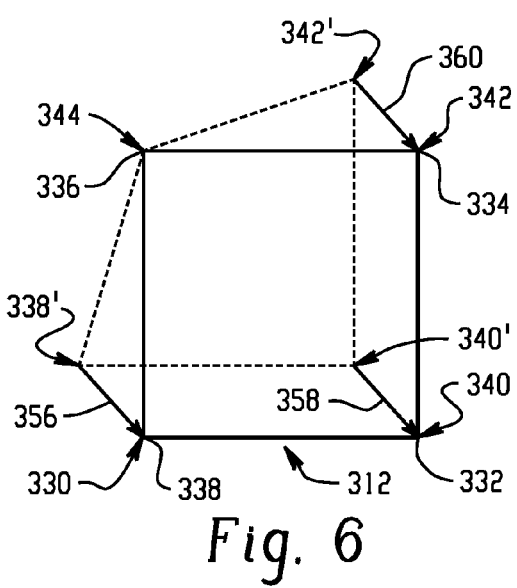
FIG. 6 is a schematic representation of the displacement of boundary vertices of a boundary cell from Lagrangian locations to their respective initial locations in accordance with an exemplary disclosed method for fluid system analysis.

Exemplary location and volume changes are also illustrated in detail views of circled area 314, as shown in FIGS. 4-6. Faces 316, 318 of boundary cell 312 are boundary faces and the other two faces 320, 322 are fluid or interior faces. Referring now to FIG. 4, each of vertices 330, 332, 334, 336 is disposed at an initial location 338, 340, 342, 344 at the start of the time-step in process 30 shown in FIG. 2. At step 114 of FIG. 2, moving boundary vertices 330, 332, 334 move at $U_{Cartesian}$, as illustrated at vectors 346, 348, 350 to their respective Lagrangian locations 338', 340' and 342'; and interior vertex 336 "floats" with the fluid at velocity $U_{Flow}$, illustrated at vector 352, from its initial location 344, to its respective Lagrangian location 344'. Referring now to FIG. 5, at step 124 of the process shown in FIG. 2, moving boundary vertices 330, 332, 334 remain at respective Lagrangian locations 338', 340', 342', while interior vertex 336 is "dragged" back to its initial location 344, from its Lagrangian location 344', as illustrated at vector 354. Finally, referring to FIG. 6, moving boundary vertices 330, 332, 334 are returned to their initial locations 338, 340, 342 from their Lagrangian locations 338', 340', 342', as illustrated by vectors 356, 358, 360, so that cell 312 and all computational cells resume their cubic shapes at step 126 of FIG. 2, before the next time-step starts.

As mentioned above, the Cartesian moving boundary may move at a different velocity from the actual physical moving boundary velocity. The inherent nature and effect of this velocity differential within the system imparts the exact physical compression or expansion effect on the interior fluid. Specifically, the ratio of volume change to the total volume of the fluid domain in the Cartesian mesh must match the ratio based on the physical dimensions. This translates into the following equation:

$$\frac{A_{Cartesian} U_{Cartesian} \Delta t}{V_{Cartesian}} = \frac{A_{Physical} U_{Physical} \Delta t}{V_{Physical}} \quad (1)$$

where $A_{Cartesian}$ is the sum of moving boundary face areas projected onto a plane perpendicular to the moving direction; $U_{Cartesian}$ is the velocity magnitude of the moving boundary vertices along the moving direction; $V_{Cartesian}$ is the total volume of the interior cells in the Cartesian computational mesh; $A_{Physical}$ is the total area of the physical moving surface projected onto the plane perpendicular to the moving direction; $U_{physical}$ is the physical moving velocity magnitude along the moving direction; and $V_{Physical}$ is the total volume of the physical geometry; $\Delta t$ is the time-step. The projected Cartesian moving area $A_{Cartesian}$ is calculated as:

$$A_{Cartesian} = \sum_{i=1}^{nfaces} A_i \cos\theta_i \quad (2)$$

where nfaces are the number of moving boundary faces (i.e., of boundary cells); $A_i$ is the area of moving boundary face i; $\theta_i$ is the angle between the normal vector of cell face i and the unit normal vector of the moving direction. Then, the adjusted moving velocity $U_{Cartesian}$ can be derived from Eq. (1) as $$U_{Cartesian} = \frac{A_{Physical}}{A_{Cartesian}} \frac{V_{Cartesian}}{V_{Physical}} U_{Physical}$$

Note that the projected area of the physical moving surface, $A_{Physical}$, and the total physical volume of the computational, or fluid, domain, $V_{Physical}$, may be calculated based on the physical surface mesh. The details of these calculations are beyond the scope of this disclosure and are not necessary to understand the various embodiments.

Referring again to FIG. 1, in various examples, a process 10 may be an iterative process over a series of time-steps (the number of which may be pre-specified), or it may repeat until a convergence criteria is met for particular solution values. In various embodiments, process 30 will repeat for a specified number of iterations, and then be exited. As illustrated at decision diamond 20, if a specified number of iterations or time-steps is not reached, an updated computational mesh may be accessed at box 21, so that the analysis can proceed through the next iteration or time-step. Alternately, in an embodiment, solution process 30 may be exited when solution convergence is achieved. Various examples are not limited to a particular method of checking solution convergence, and various methods may be used in connection with various embodiments. Further explanation of methods to check solution convergence is not needed to understand various aspects.

After process 30 is exited, solution post-processing may occur as illustrated at Box 22, and the solution may be verified and validated, as shown at Box 24. As with checking solution convergence, various methods of post-processing CFD analysis results and verifying and validating CFD results may be used in various embodiments. Detailed descriptions of post-processing, verification and validation methods are beyond the scope of this disclosure and are not necessary to understand various aspects.

IV. Computing Apparatus and Systems

It is understood that the various embodiments may be implemented individually, or collectively, in devices comprised of various hardware and/or software modules and components. Such a device, for example, may comprise a processor, a memory unit, and an interface that are communicatively connected to each other, and may range from desktop, server and/or laptop computers, to consumer electronic devices such as mobile devices and the like. Such devices may include input and peripheral devices, and other components that enable the device to read and receive data and instructions from various media, input devices, a network, or other inputting means in accordance with the various embodiments. It should be understood, however, that the scope of the present disclosure is not intended to be limited to one particular type of device.

Figure 7:
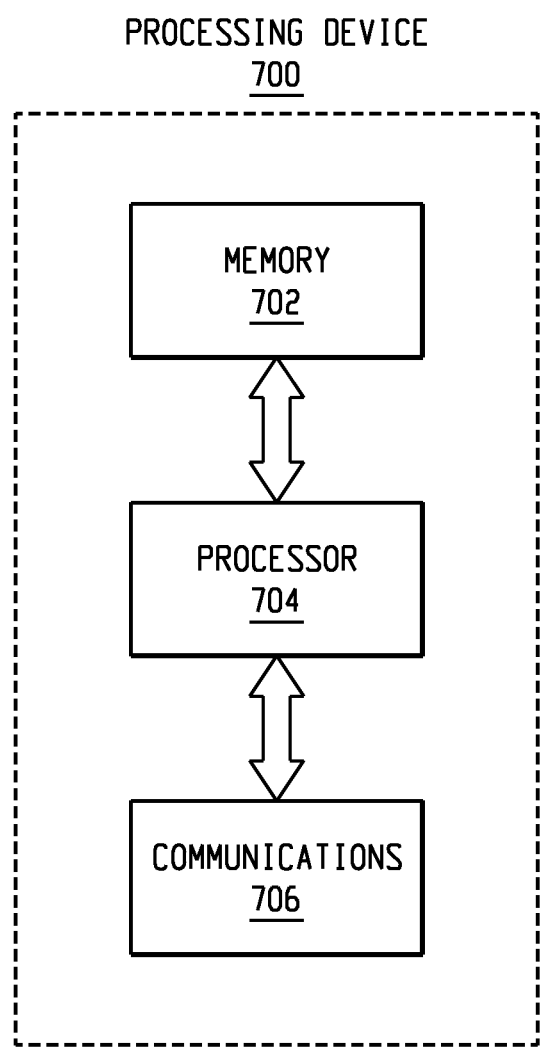
FIG. 7 is a schematic representation of an exemplary electronic processing device which may be utilized in accordance with the various embodiments.

As an example, FIG. 7 illustrates a block diagram of a device 700 within which various embodiments may be implemented. The device 700 comprises at least one processor 704 and/or controller, at least one memory unit 702 that is in communication with the processor, and at least one communication unit 706 that enables the exchange of data and information, directly or indirectly, with a communication medium, such as the Internet, or other networks, entities and devices. The processor 704 can execute program code that is, for example, stored in the memory 702. The communication unit 706 may provide wired and/or wireless communication capabilities in accordance with one or more communication protocols and interfaces, and therefore it may comprise the proper transmitter/receiver antennas, circuitry and ports, as well as the encoding/decoding capabilities that may be necessary for proper transmission and/or reception of data and other information.

Similarly, the various components or sub-components within each module may be implemented in software, hardware, and/or firmware. The connectivity between the modules and/or components within the modules may be provided using any of a variety of connectivity methods and media, including, but not limited to, communications over the Internet, wired, or wireless networks using the appropriate protocols.

Various embodiments described herein are described in the general context of method steps or processes, which may be implemented in one embodiment by a computer program product or module, embodied in a computer-readable memory, including computer-executable instructions, such as program code, and executed by apparatus such as computers or computing systems in networked environments. A computer-readable memory may include removable and non-removable storage devices including, but not limited to, Read Only Memory (ROM), Random Access Memory (RAM), compact discs (CDs), digital versatile discs (DVD), etc. As such, the various disclosed embodiments can be implemented by computer code embodied on non-transitory computer readable media. In other embodiments processes may be employed to perform operations on data, wherein the instructions for process operations and the data, or elements thereof, may reside on or be transferred through one or more computing devices or systems.

Generally, program products or modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. Various embodiments may comprise a computer-readable medium including computer executable instructions that, when executed by a processor, cause an apparatus to perform the methods and processes described herein. Apparatus or systems utilized in connection with the various examples may be of a general-purpose character, or may be specially constructed, designed or programmed for the required purposes. In various embodiments, such apparatuses and systems may be configured or activated by computer programs, instructions and/or data stored in or transferred into the apparatus or system.

Various embodiments may be implemented in software, hardware, application logic or a combination of software, hardware and application logic. The software, application logic and/or hardware may reside on a client device, a server or a network component. If desired, part of the software, application logic and/or hardware may reside on a client device, part of the software, application logic and/or hardware may reside on a server, and part of the software, application logic and/or hardware may reside on a network component. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of such a device described and depicted in FIG. 7. A computer-readable medium may comprise a computer-readable storage medium that may be any media or means that can contain or store the instructions for use by or in connection with an instruction execution system, apparatus, or device, such as a computer. In one embodiment, the computer-readable storage medium is a non-transitory storage medium.

If desired, the different functions discussed herein may be performed in a different order and/or concurrently with each other. Furthermore, if desired, one or more of the above-described functions may be optional or may be combined.

Although various aspects are set out in the independent claims, other aspects comprise other combinations of features from the described embodiments and/or the dependent claims with the features of the independent claims, and not solely the combinations explicitly set out in the claims.

The foregoing description of embodiments has been presented for purposes of illustration and description. The foregoing description is not intended to be exhaustive or to limit various embodiments to the precise form disclosed, and modifications and variations are possible in light of the above teachings or may be acquired from the practice of various embodiments. The embodiments discussed herein were chosen and described in order to explain the principles and the nature of various embodiments and its practical application to enable one skilled in the art to utilize various embodiments and with various modifications as are suited to the particular use contemplated. The features of the embodiments described herein may be combined in all possible combinations of methods, apparatus, modules, systems, and computer program products.

What is claimed is:

1. A method of simulating a fluid system, comprising:
using a computational mesh of cells to represent a fluid system, each cell having faces, vertices and a volume, the system characterized by governing equations and having a set of boundaries, at least one of which is a moving boundary;
representing the fluid system with a computer-based model, the fluid system having at least one boundary, the model simulating the fluid system with at least a plurality of cells;
identifying interior cells as those cells having a cell center within an interior of the fluid system;
identifying moving cell faces as those separating an interior cell and a ghost cell and which are in proximity to a moving boundary of the fluid system at the beginning of a time-step; wherein each cell vertex that is disposed, at the beginning of the time-step, at an initial location on a respective moving cell face is a moving boundary vertex, and wherein each interior cell vertex that is disposed, at the beginning of the time-step, at an initial location not touching a moving cell face is an interior vertex;
accessing system pressure values;
calculating the value of at least one representative thermodynamic property of the system;
determining a Lagrangian location of each interior vertex at the end of the time-step, as each interior vertex moves with the fluid flow in a Lagrangian fashion;
determining a Lagrangian location of each moving boundary vertex at the end of the time step, as each moving boundary vertex moves with the respective moving cell face;
determining the change in volume of each interior cell over the time-step, based on the displacement of its respective cell vertices to their respective Lagrangian locations;
calculating the value of at least one representative thermodynamic property of the system based on the changes in the interior cell volumes; and
calculating at least one representative flux value across one or more interior cell volumes by returning the respective interior vertices from their Lagrangian locations to their respective initial locations.

2. The method of claim 1, wherein the operation of calculating at least one flux value employs a ghost cell process to determine the cell volumes of the respective interior cells.

3. The method of claim 2, wherein the calculation process includes the step of correcting the system pressure values, and the calculation process is iteratively repeated until a convergence criterion is met.

4. The method of claim 3, wherein the solution process further includes the steps of returning the moving boundary vertices to their respective initial locations at the end of the time-step, and updating the location of the at least one moving boundary at the end of the time-step, and wherein the solution process is iteratively repeated until a convergence criterion is met.

5. The method of claim 4, wherein each moving boundary has a velocity and each boundary vertex disposed on a moving cell face has a velocity, the velocity of the boundary vertex being based on the velocity of the respective moving boundary.

6. The method of claim 5, wherein the computational mesh is a Cartesian grid.

7. A method of simulating a fluid system, comprising:
accessing a data representation of a model associated with a transient fluid system including a fluid domain within a set of boundaries and having at least one flow velocity value, the fluid system characterized by a set of governing equations that express relationships among a set of thermophysical properties of the fluid system, each governing equation including at least one variable corresponding to a thermophysical property, wherein the set of thermophysical properties includes at least pressure and velocity, the fluid system further having at least one moving boundary wherein each moving boundary has a boundary velocity;
accessing a computational mesh representation of the fluid system, the computational mesh including a set of computational cells, each computational cell having a cell center, a volume, a set of cell faces, and a set of vertices;
applying a solution process over a time step, the solution process including:
identifying, as an interior cell, any computational cell with a cell center disposed within the fluid domain at the beginning of the time step;
discretizing one or more governing equations over cells of the computational mesh;
identifying, as a moving cell face, any cell face that separates an interior cell and a ghost cell and which is in proximity to a moving boundary at the beginning of a time-step;
identifying, as moving boundary vertices, any cell vertices that are disposed at an initial location on a moving cell face at the beginning of the time step;
identifying, as interior vertices, any cell vertices that are disposed at an initial location not touching a moving cell face at the beginning of the time-step;
applying a computational process to determine values for the variables in the discretized governing equations, the computational process including the steps of: accessing predicted pressure values of the fluid system; updating one or more flow velocity values based on the pressure values; updating the cell volume of each interior cell based on the location of each cell vertex as each interior vertex moves with the fluid flow to a Lagrangian location over the time step and as each moving boundary vertex moves with the respective moving cell face to a Lagrangian location over the time step; updating one or more flow velocity values and calculating the value of at least one other representative thermophysical property of the system based on the updated pressure values and changes in the volumes of interior cells over the time step; and calculating at least one flux value across one or more interior cell volumes by returning the respective interior vertices of the one or more interior cells from their Lagrangian locations to their respective initial locations.

8. The method of claim 7, wherein the calculating at least one flux value employs a ghost cell technique to determine the cell volumes of the respective interior cells.

9. The method of claim 8, wherein the solution process includes the step of correcting the pressure values of the fluid system, and wherein the solution process is iteratively repeated until a convergence criterion is met.

10. The method of claim 9, wherein the computational process includes the step of returning the moving boundary vertices to their respective initial locations at the end of the time-step, and updating the location of the at least one moving boundary at the end of the time-step and wherein the computational process is iteratively repeated until a convergence criterion is met.

11. The method of claim 10, wherein the velocity of each boundary vertex disposed on a moving cell face is based on the velocity of the respective moving boundary.

12. The method of claim 7, wherein the computational mesh is a Cartesian grid.

13. A non-transitory computer readable medium having instructions for causing an apparatus to perform the following:

using a computational mesh of cells to represent a fluid system, each cell having faces, vertices and a volume, the system characterized by governing equations and having a set of boundaries, at least one of which is a moving boundary;

representing the fluid system with a computer-based model, the fluid system having at least one boundary, the model simulating the fluid system with at least a plurality of cells;

identifying interior cells as those cells having a cell center within an interior of the fluid system;

identifying moving cell faces as those separating an interior cell and a ghost cell and which are in proximity to a moving boundary of the fluid system at the beginning of a time-step; wherein each cell vertex that is disposed, at the beginning of the time-step, at an initial location on a respective moving cell face is a moving boundary vertex, and wherein each interior cell vertex that is disposed, at the beginning of the time-step, at an initial location not touching a moving cell face is an interior vertex;

accessing system pressure values;

calculating the value of at least one representative thermodynamic property of the system;

determining a Lagrangian location of each interior vertex at the end of the time-step, as each interior vertex moves with the fluid flow in a Lagrangian fashion;

determining a Lagrangian location of each moving boundary vertex at the end of the time step, as each moving boundary vertex moves with the respective moving cell face;

determining the change in volume of each interior cell over the time-step, based on the displacement of its respective cell vertices to their respective Lagrangian locations;

calculating the value of at least one representative thermodynamic property of the system based on the changes in the interior cell volumes; and calculating at least one representative flux value across one or more interior cell volumes by returning the respective interior vertices from their Lagrangian locations to their respective initial locations.

* * * * *